Jan. 12, 1960 K. F. JOHNSON 2,920,511
APPARATUS FOR COLDWELDING METAL PARTS TOGETHER
Filed Nov. 8, 1955 5 Sheets-Sheet 2

INVENTOR
K. F. JOHNSON
BY C. A. Hamilton
ATTORNEY

Jan. 12, 1960  K. F. JOHNSON  2,920,511
APPARATUS FOR COLDWELDING METAL PARTS TOGETHER
Filed Nov. 8, 1955  5 Sheets-Sheet 3

INVENTOR
K. F. JOHNSON
BY C. M. Hamilton
ATTORNEY

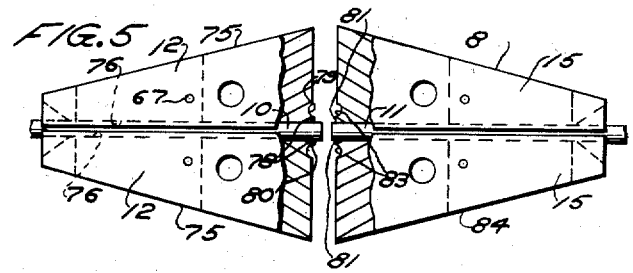

United States Patent Office 2,920,511
Patented Jan. 12, 1960

2,920,511

APPARATUS FOR COLDWELDING METAL PARTS TOGETHER

Kenneth F. Johnson, Cicero, Ill., assignor to Western Electric Company, Incorporated, New York, N.Y., a corporation of New York Application November 8, 1955, Serial No. 545,650

3 Claims. (Cl. 78—82)

This invention relates to apparatus for coldwelding metal parts together, and more particularly to apparatus for coldwelding ends of aluminum wire together.

In coldwelding the ends of wires together for continuously operable, high speed machines for processing wire, such as, for example, machines for covering the wires with insulation, it is essential to rapidly splice wires from full reels to trailing ends of the wires of exhausted reels without interrupting the operation of the machine. One device for rapidly effecting such welds is disclosed and claimed in copending application Serial No. 397,561, filed December 11, 1953, by K. F. Johnson-H. G. Kohr for "Apparatus for Coldwelding Metal Parts Together," now abandoned. However, for certain job requirements, it is desirable to be able to load and unload this device more rapidly than has been possible hitherto.

An object of the invention is to provide new an improved apparatus for coldwelding metal parts.

Another object of the invention is to provide apparatus for coldwelding the ends of aluminum wires together.

Another object of the invention is to provide apparatus for rapidly coldwelding the ends of aluminum wires together to make high tensile strength welds without impairing the strength of the portions of the wires adjacent to the welds.

In an apparatus illustrating certain features of the invention, a pair of wire clamps are movable between a retracted position and a welding position. Means are provided for automatically opening the jaws of the clamps when the jaws are moved toward the retracted position and closing the jaws when they are moved toward the welding position.

A complete understanding of the invention may be obtained from the following detailed description of an apparatus forming a specific embodiment thereof, when read in conjunction with the appended drawings, in which Fig. 1 is a front elevation of an apparatus forming a specific embodiment of the invention;

Fig. 5 is a top plan view of the apparatus shown in Fig. 1;

Fig. 6 is an enlarged top plan view of a portion of the apparatus shown in Fig. 1 with parts thereof shown in one position;

Fig. 7 is a view similar to Fig. 6 with the parts shown therein in a second position;

Fig. 8 is a perspective view of a portion of the apparatus;

Fig. 9 is a perspective view of a portion of the apparatus;

Fig. 10 is a fragmentary sectional view taken along line 10—10 showing a cutter positioning shaft and the cooperating structures.

Figure 1:
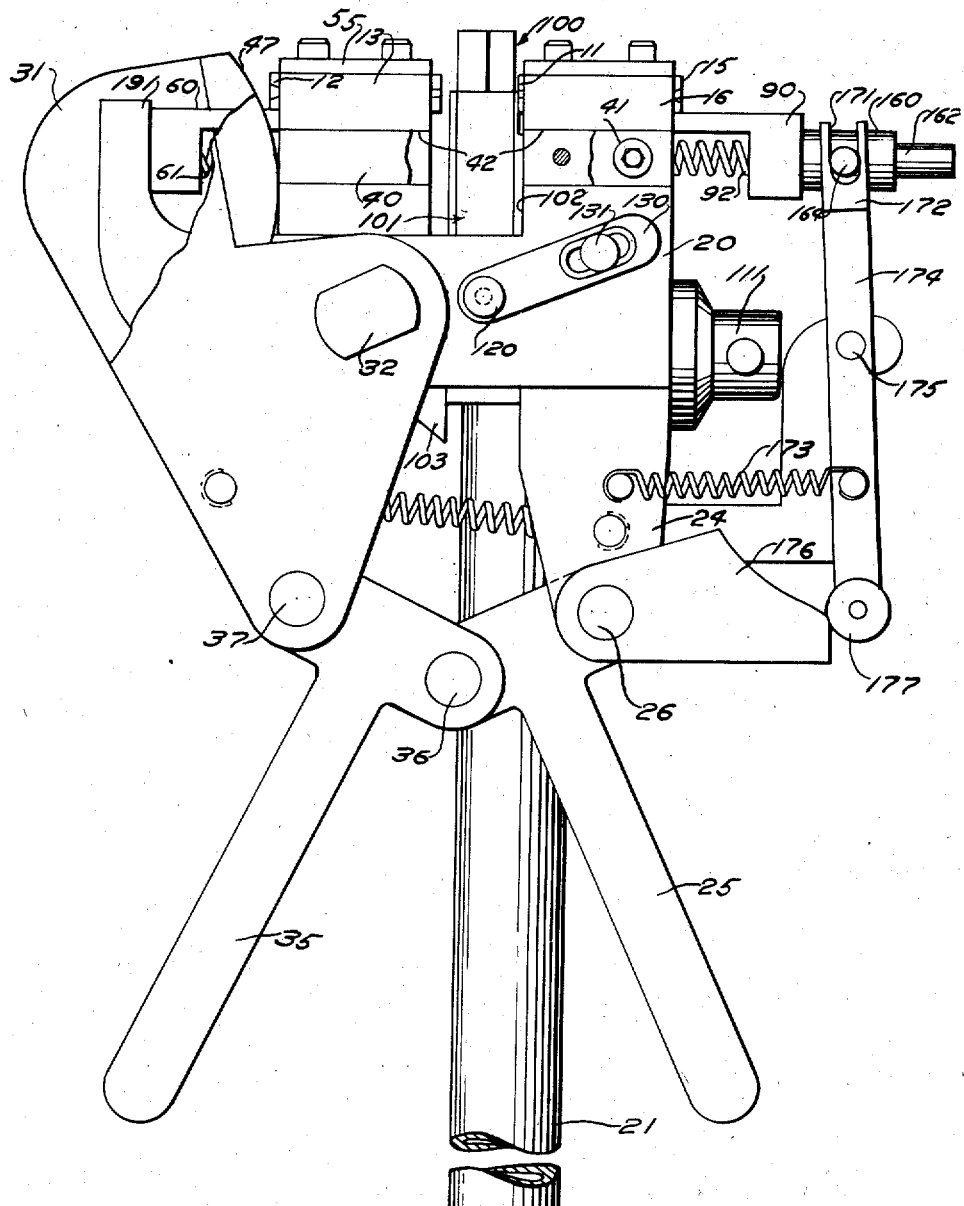

Referring now in detail to the drawings, there is shown therein an apparatus for shearing the end portions off of wires 10 and 11 of annealed aluminum, annealed copper or other metal suitable for coldwelding, and coldwelding the wires together to form a welded joint that is as strong as the wires themselves. This apparatus includes wedge-shaped jaws 12 (Figs. 1 and 5) mounted slidably in a movable holder 13 for tightly gripping the wire 10, and wedge-shaped jaws 15 mounted slidably in a fixed holder 16 for gripping the wire 11 tightly.

The holder 16 (Fig. 1) forms a portion of a frame 20 adjustably mounted on a standard 21. The frame 20 includes arms 24 to which a hand-operated lever 25 is secured pivotally by a pin 26 fixed to the lever 25, and also includes arm 30 to which an actuating lever 31 is secured pivotally by a pin 32. A second hand-operated lever 35 is secured by a pin 36 pivotally to the hand-operated lever 25 to form a toggle-joint linkage therewith, and a pin 37 secures the lever 35 to the actuating lever 31. Rigid guide bars 40 are secured by cap screws 41 in parallel positions projecting from grooves 42 in the frame 20, and the movable holder 13 is provided with guideways 45 to mount the holder 13 slidably on the guide bars 40 so that the holder 13 may be moved toward and away from the holder 16. When the hand-operated levers 25 and 35 are pressed toward one another, the lever 31 is swung in a clockwise direction, as viewed in Fig. 1, to force the holder 13 toward the right through plates 46 having hardened arcuate edges 47 and mounted integrally on the lever 31, the edges 47 serving to engage the holder 13. A pin 49 having a ball end portion 50 thereon projects into an opening 51 formed in the holder 13, and when the levers 25 and 35 are moved apart from one another, the ball end portion 50, after a slight lost motion, engages the holder 13 and moves it to the left, as viewed in Fig. 11.

Figure 4:
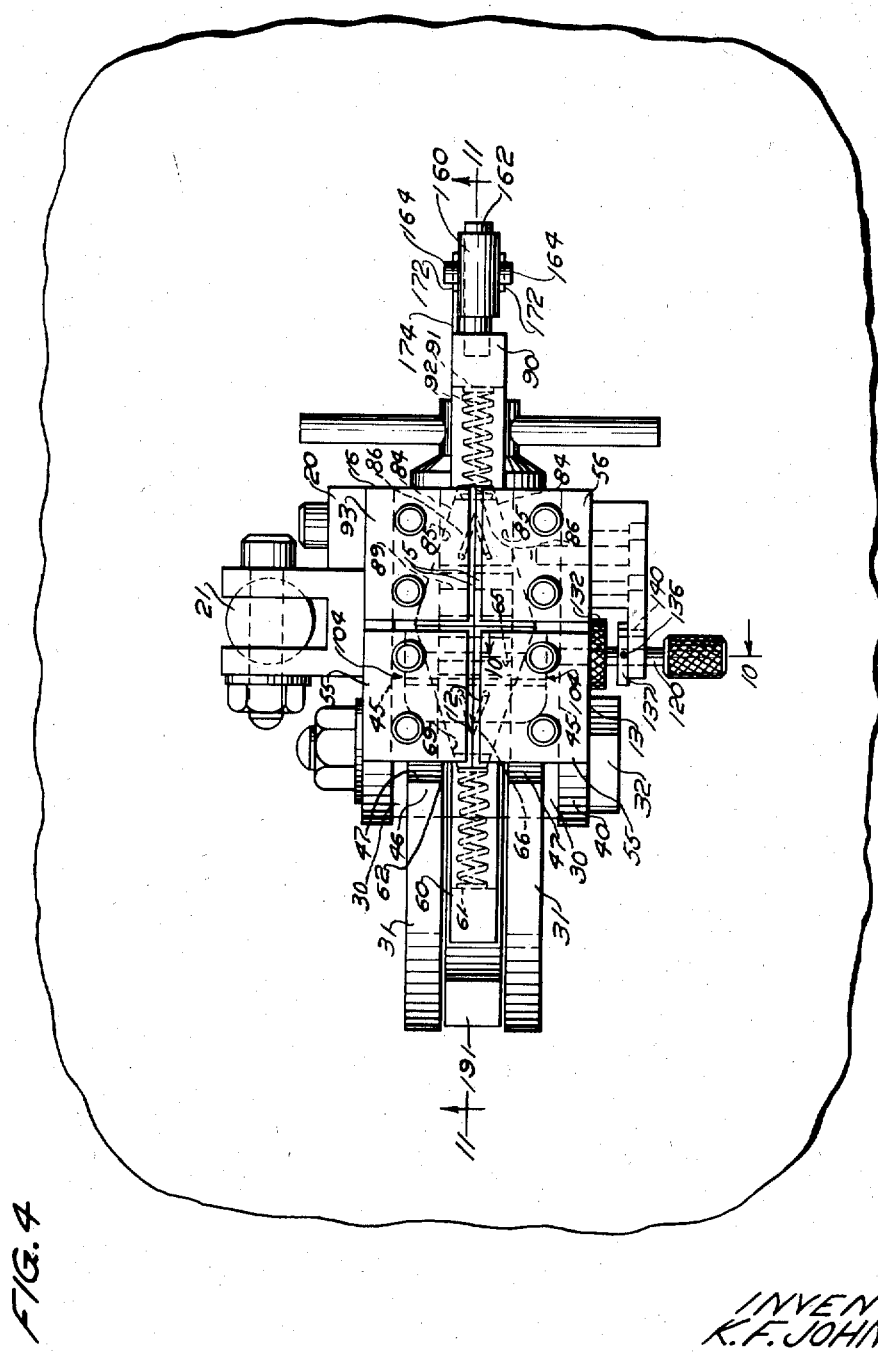
Fig. 4 is a fragmentary side elevation of the apparatus shown in Fig. 1.

Plates 55 (Fig. 1) secure the jaws 12 slidably in the holder 13, and plates 56 secure the jaws 15 in the holder 16. Portions of the jaws 12 rest on a jaw actuating slide 60, which is urged to the left by a strong-compression spring 61 bearing against the slide 60 and against the holder 13. The slide is supported completely in a guideway 62 (Fig. 4) formed in the holder 13. Pins 64 (Fig. 11) secured to the jaws 12 project downwardly into laterally extending slots 65 (Figs. 4 and 11) formed in the slide 60 so that the jaws are carried with the slide 60 when it is moved lengthwise, but are free to move laterally with respect to this direction of movement. A wire spring 66 (Figs. 1 and 11) has bent end portions which project into bores 67 formed in the jaws 12, and constantly urges the jaws apart and into engagement with sloping faces 69 (Fig. 4) formed on the holder 13. The spring 61 normally urges the slide 60 to the left, as viewed in Fig. 11, with sufficient strength to force the jaws 12 completely together from the camming action of the sloping faces 69 against sloping faces 75 on the jaws 12, and when the slide 60 is pushed toward the right, as viewed in Fig. 11, the spring 66 moves the jaws 12 apart to open them.

Each of the jaws 12 is provided with a groove 76 (Fig. 5), the surface of which is roughened by sand blasting, or the like, which is substantially, but not quite, 180° of a circle of the same diameter as the wire 10. Hence, the jaws 12 never quite close when the wire is positioned therebetween while the grooves 76 do conform closely to the periphery of the wire. The jaws 12 are also provided with sharp cutting edges 78 designed to cut flash from a weld, and also have semi-annular relieved portions 79 therein to provide clearance for the flash. The edges 78 are flush with the forward faces of the jaws 12, and parabolic surfaces or nose portions 80 recede from the edges 78 to provide clearance for the flash and to permit the jaws to slide relative to the flash when the jaws are opened.

The jaws 15 (Fig. 5) are identical in construction with the jaws 12, and also are provided with cutting edges 81 and parabolic receding surfaces or nose portions 83. The jaws 15 are provided with sloping faces 84 sliding along sloping faces 85 (Fig. 4) of the holder 16. The jaws 15 are constantly urged away from one another by a U-shaped wire spring 86 (Fig. 11) identical with the spring 66, and pins 64 project into laterally extending slots 89 formed in jaw actuating slides 60 and 90. The slide 90 is urged constantly to the right, as viewed in Fig. 4, by a strong compression spring 92 bearing against the end of a bore 91 formed in the slide 90 and the end of a bore 93 formed in the holder 16. The slide 90 is normally urged to the right, as viewed in Fig. 4 to force the jaws 15 completely to the right. When the slide 90 is pressed to the left, the jaws are moved to the left relative to the holder 16, and the spring 86 urges the jaws 15 away from one another so that the wire 11 may be threaded through the jaws or pulled from the jaws.

Figure 2:
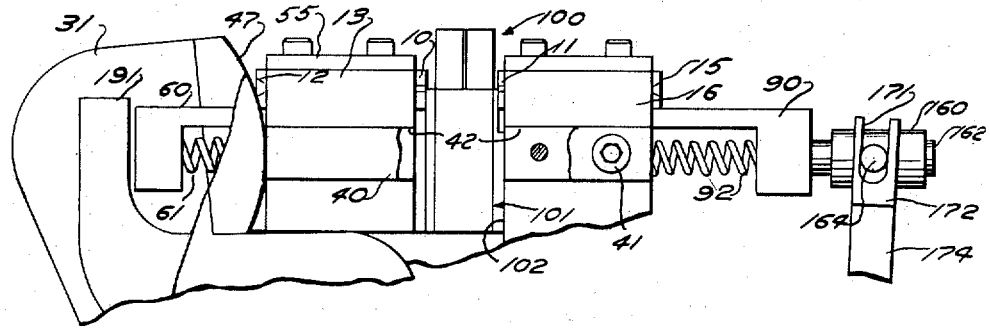
Fig. 2 is a fragmentary front elevation of the upper portion of the apparatus shown in Fig. 1 disclosing the jaws in welding position.
Figure 3:
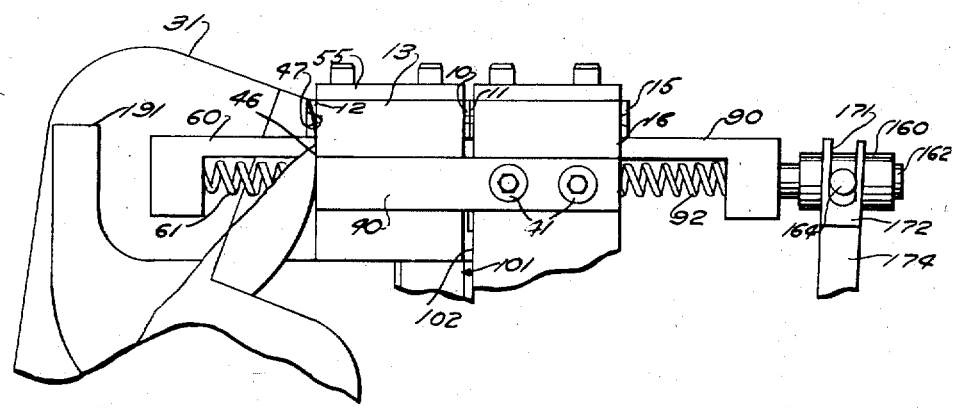
Fig. 3 is a fragmentary, front elevation of the apparatus shown in Fig. 1 disclosing the jaws in welding position.
Figure 11:
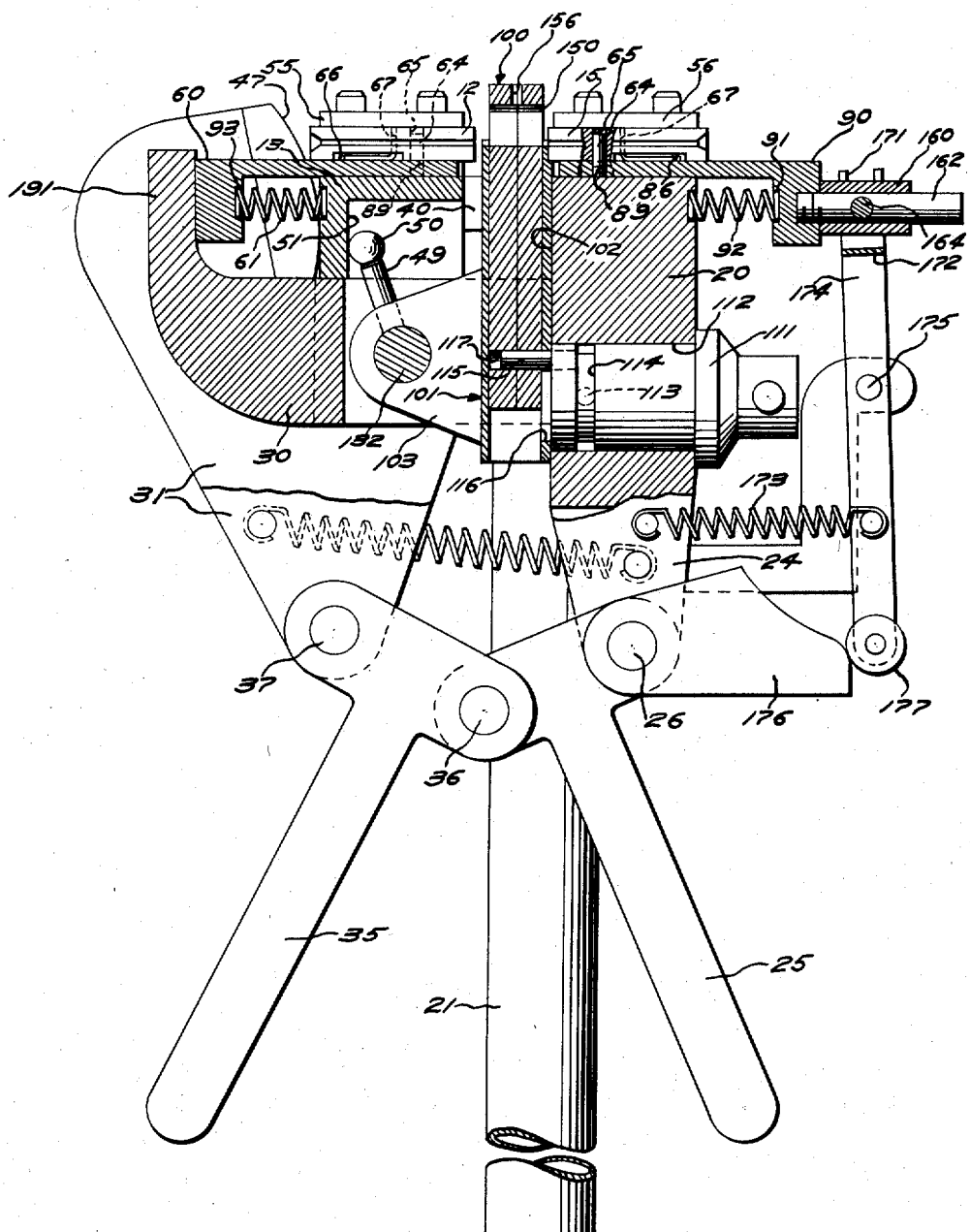
Fig. 11 is a section view taken along line 11—11 of Fig. 4 showing the jaws of the welder in retracted position.

An inner shear 100 (Figs. 1, 2 and 3) is mounted tightly in, but slidably under pressure with respect to, an anvil shear 101 mounted slidably and loosely between a guide surface 102 formed on the frame 20 and a guide 103 mounted pivotally on the pin 32 and closely slidable between surfaces 104 (Fig. 4) of the arm 30. The play thus provided between the guide surface 102 and the guide 103 (Fig. 1) permits the shear 101 to be pivoted slightly off vertical to provide clearance for the jaws 15 to release the wire or permit stringing the wire 11 through the jaws 15 when the shear 101 is raised to the same level as the jaws 15. A hand-operated shaft 111 is mounted rotatably in a bore 112 in the frame 20 and is retained therein by set screw 113 projecting into an annular groove 114 formed in the shaft 111 (Fig. 11). A pin 115 mounted eccentrically on the shaft 111 projects from the inner end thereof through laterally extending slots 116 and 117 formed in the outer shear 101 and the inner shear 100, respectively (Figs. 7 and 8). With the holder 13 withdrawn as far as possible to the left, as viewed in Figs. 1 and 11, the shaft 111 is rotated manually, which rotates the pin 115 to raise the shears 100 and 101, the shear 101 being raised at this time merely by friction between it and the shear 100. This is continued until the tops of the shears 100 and 101 are brought not quite, but almost, to the level of the grooves in the jaws 12 and 15, and then the operator pushes in a shaft 120 to press a pin 121 (Fig. 10) secured eccentrically to the shaft 120 into a laterally extending slot 123 formed in the shear 101, and the shaft 111 then is turned further to raise the inner shear 100 while the shear 101 is held against movement therewith by the pin 121, the width of the slot 116 being greater than that of the slot 117 permitting such movement to occur between the two shears.

The shaft 120 with the pin 121 eccentrically secured thereto is mounted slidably and rotatably in a slotted arm 130 secured adjustably to the frame 20 by a cap screw 131, and also is slidably and rotatably mounted in an eccentric bushing 132 mounted in the arm 30 and secured therein in any desired adjusted position by a set screw 135 (Fig. 10). A semi-circular stop collar 137, which is fixed adjustably to the shaft 120 by a set screw 136, and a stop pin 140 permit the shaft 120 to be rotated approximately 180° between a position in which the pin 121 (Fig. 10) is in its lowermost position and a second position in which the pin 121 is in its uppermost position. The pin 140 (Fig. 4) projects from the arm 130, and serves to limit the movement of the collar 137 between these extreme positions of the pin 121.

The shaft 120 (Fig. 10) may be rotated to raise the pin 121 from its lowermost position to its uppermost position to raise semi-cylindrical grooves 151 acting as shearing edges formed in the shear 101 (Fig. 8) to the level of the grooves in the jaws 12 and 15, the position of the eccentric bushing 132 having been set to assure this when the collar 137 is in engagement with the pin 140. Sharpenable shearing edges 149 (Fig. 7) are formed at the lower edges of the slots 150 formed in the inner shear 100, and shearing edges 151 (Fig. 8) are formed on the anvil shear 101 to shear the wires completely transversely to the longitudinal axis of the wires to provide clean, unoxidized surfaces. The slots 150 extend into a discharge cavity 155 projecting through the bottom of the inner shear 100, and an opening 156 at the top of the shear 100 is provided to observe how far the wires are projected into the shear 100 when the wires are threaded in the apparatus.

A jaw-opening bushing or sleeve 160 (Figs. 1 and 11) is mounted slidably on a rod 162 secured to the slide 90, and pins 164 are fixed to and project laterally from the bushing 160. The pins 164 project into slots 171 in arms 172 of a forked lever 174 mounted pivotally on a pin 175 fixed to the frame 20, and a cam 176 fixed to the pin 26 engages a follower roll 177 on the lever 174 urged clockwise, as viewed in Figs. 1 and 11, by a spring 173. A bar or stop 191 (Figs. 1–4 and 11) fixed to the frame 20 is in the path of the slide 60 as the slide 60 is moved to the left and prevents further movement of the slide 60 to compress the spring 61 to open the jaws 12.

The configuration of the cam 176 is such that when the jaw holder 13 is moved to its fully open position, the bushing 160 is forced against the slide 90 to compress the spring 92 to open the jaws 15. Simultaneously the holder 13 moves the slide 60 against the stop 191 and continues to move to compress the spring 61, which opens the jaws 12. Thus, the wires can be inserted into the pairs of jaws. The cam 176 permits the spring 173 to move the bushing 160 back away from the slide 90 as the jaw-holder 13 is moved to its intermediate or shearing position, and the holder 13 also moves the slide 60 completely away from the stop 191. Hence, the slides 60 and 90 are actuated to open the jaws 12 and 15 only at the end of the opening movement of the tool. That is, the only time the slides 60 and 90 are engaged is when the jaw-holder 13 is almost fully retracted from the jaw-holder 16.

Operation

With the levers 25 and 35 moved apart to locate the holder 13 in its furthermost position away from the holder 16, the lever 174 and the stop 191 push the slides 60 and 90 in to open the pairs of jaws 12 and 15. The shaft 120 is actuated to retract the pin 121, and the shaft 111 is turned to raise the inner shear 100 and the anvil shear 101 through the pin 115 projecting into the slots 116 and 117 until the anvil shear 101 is raised almost to the level of the grooves 76 and 79 (Figs. 5 and 6) in the jaws 12 and 15 (Fig. 1). Then, the shaft 120 is actuated to push the pin 121 into the slot 123 (Fig. 10) in the anvil shear 101 to hold the anvil shear 101 at this elevation. The shaft 111 then is turned further to raise the inner shear 100 relative to the anvil 101, the slot 117 (Fig. 9) permitting such movement between the inner shear and the anvil to position the slots 150 (Fig. 7) in alignment with the grooves 76 and 79 in the jaws. The wires 10 and 11 then are pushed through the grooves 76 and 79 until they project through the slots 150 in the shear 100.

The levers 25 and 35 are pushed together just far enough to close the jaws on the wires, and the shaft 120 then is turned until the stop collar 137 engages the pin 140. This turns the eccentric pin 121 (Fig. 10) to raise the anvil 101 to a position in which the shearing edges 149 are against and support the wires 10 and 11. Then the levers 25 and 35 are pressed toward one another to force the ends of the jaws 12 and 15 hard against the anvil 101, which cams the jaws into very tight gripping engagement with the wires 10 and 11, and the ends of the jaws engage the anvil 101 flush. The shaft 111 then is rotated manually to lower the inner shear 100 relative to the anvil 101, the anvil 101 being held in its elevated position by the pin 121, and the wires 10 and 11 are sheared making clean, transverse cuts at points thereon projecting from the jaws 12 and 15, respectively, distances equal to the thickness of the walls of the anvil having the shearing edges 149 formed thereon.

The levers 25 and 35 then are moved slightly apart to release the anvil 101, the shaft 120 is pulled to draw the pin 121 from the slot 123, and the shaft 111 is rotated to move the anvil 101 and the shear 100 down out of the path of the jaws 12 and the holder 13. The levers 25 and 35 then are pressed together to force the portions of the wires 10 and 11, projecting beyond the jaws 12 and 15, tightly together to form a very tenacious high tensile strength weld, after which the levers 25 and 35 are moved apart manually, the jaws 12 and 15 permitting sliding movement between the wires and the jaws on the retracting stroke since the wedging action is relieved by the direction of movement. The slide 90 is pressed in by the bushing 160 to open the jaws 15 very wide through the action of the springs 92, and the slide 60 engages the stop before the holder 13 reaches the end of its opening movement to open the jaws 12. Since only the springs 66 and 86 (Fig. 11) urge the pairs of jaws apart, the nose portions of the jaws are readily slid out of the flash before opening so that damage to the weld is prevented. The rounded nose portions 80 and 83 also aid in extracting the nose portions from the flash since they are cammed out of the flash as the jaws tend to open and have no corners to catch on the flash. The wires 10 and 11 welded together then are lifted out of the apparatus between the open jaws 12 and 15 after which the above-described procedure may be repeated.

The above-described apparatus serves to rapidly prepare wires for coldwelding, and also effect the coldwelding operation very rapidly, the entire operation being capable of completion within a fraction of a minute. The apparatus may be quickly loaded and unloaded with wires. Obviously, the slide 60 also may be actuated to open the jaws 12 by means (not shown) similar to the collar 160, the rod 162, the lever 174 and the elements associated therewith for actuating the slide 90.

Certain features of the above-described apparatus are disclosed and claimed in the above-mentioned copending application Serial No. 397,561.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for coldwelding metal parts which comprises a first pair of jaws, a second pair of jaws, said jaws being adapted to grip separate parts, a stationary holder for holding the first pair of jaws, a second holder slidably mounted on the stationary holder for holding the second pair of jaws in aligned relation with the first pair of jaws, means for moving the movable holder on the stationary holder to a retracted position, normally operated jaw actuating means mounted in the stationary and movable holders acting on each pair of jaws for urging the jaws to grip the parts, a stop rigidly mounted on the stationary holder in the path of the movable holder for engaging the jaw actuating means in the movable holder to open the second pair of jaws as the movable holder is retracted, and means actuated by the holder moving means for engaging and moving the jaw actuating means of the stationary holder to open the first pair of jaws.

2. In a coldwelding apparatus having a stationary holder and a movable holder mounted thereon, each of said holders having cam surfaces, a pair of jaws movably mounted within each holder having surfaces cooperable with the cam surfaces for closing the cooperating pair of jaws, an actuator associated with each holder for effectuating relative movement between each pair of jaws and the cooperating holders, and means for positioning the actuators which comprises springs for urging each of the actuators into position to close the associated pair of jaws, a stop for engaging and holding the actuator associated with the movable holder, a first linkage engaging the actuator associated with the stationary holder, a cam engaging and holding the first linkage to hold the engaged actuator in position to maintain the cooperating jaws open, a second linkage pivotally mounted on the stationary holder for engaging and moving the movable holder relative to the associated actuator toward the stationary holder for closing the jaws in the movable holder, a pair of interconnected pivotally mounted handles connected to the cam and the second linkage for moving the cam and second linkage to effectuate the simultaneous closing of each pair of jaws and movement of the jaws in the movable holder against the jaws in the stationary holder, and means operated by restoration of the second linkage to the initial position for engaging and moving said movable holder relative to the associated actuator and toward the stop to open the jaws in the movable holder.

3. An apparatus for coldwelding the ends of a pair of wires together, a stationary holder having sloping internal walls, a first pair of jaws slidably mounted within the stationary holder for holding a first wire therebetween, said jaws having sloping sides complementing the walls of the stationary holder, spring means between the jaws to hold the jaws in engagement with the walls of the stationary holder, a first actuator slidably mounted in the holder, said actuator having a transverse slot formed therein, a pair of pins respectively extending from the first jaws into the transverse slot, means for urging the actuator and the pins to move the first jaws from the stationary jaw holder, a first linkage for advancing the first actuator and pins to move the first jaws against the sloping walls of the stationary holder whereupon the jaws move together and the pins move in the transverse slot, a second holder slidably mounted on the stationary holder and having sloping internal walls, a second pair of jaws slidably mounted within the second holder for holding a second wire therebetween, said second jaws having sloping sides complementing the sloping internal walls of the second holder, spring means between the jaws to hold the jaws in engagement with the walls of the stationary holder, a second actuator slidably mounted on the second holder, said second actuator having a transverse slot formed therein, a second pair of pins extending respectively from the second pair of jaws into the transverse slot in the second actuator, a second linkage for moving the second jaw holder, means for simultaneously operating said first and second linkages to move the first actuator to close the first pair of jaws and to move the second holder, and means for holding the second actuator and the pins against movement to hold the second jaws against movement with the second holder whereupon the second holder forces the jaws together and the second pins move along the transverse slot formed in the second actuator.

References Cited in the file of this patent

UNITED STATES PATENTS

| | | |
|---|---|---|
| 1,389,975 | Darsons | Sept. 6, 1921 |
| 1,464,434 | Ljungstrom | Aug. 7, 1923 |

(Other references on following page)

UNITED STATES PATENTS

| | | |
|---|---|---|
| 2,125,068 | Dempsey | July 26, 1938 |
| 2,369,180 | Rosenthal | Feb. 13, 1945 |
| 2,462,936 | Bechler | Mar. 1, 1949 |
| 2,491,358 | Bogart | Dec. 13, 1949 |
| 2,715,345 | Rozmus | Aug. 16, 1955 |
| 2,772,095 | Barnes | Nov. 27, 1956 |
| 2,774,262 | Sowter | Dec. 18, 1956 |
| 2,779,954 | Barnes | Feb. 5, 1957 |

FOREIGN PATENTS

| | | |
|---|---|---|
| 720,113 | Great Britain | Dec. 15, 1954 |